B. B. SCHÄFER.
APPARATUS FOR MEASURING THE VACUUM IN LARGE RECTIFIERS.
APPLICATION FILED JULY 14, 1920.
1,377,282.   Patented May 10, 1921.
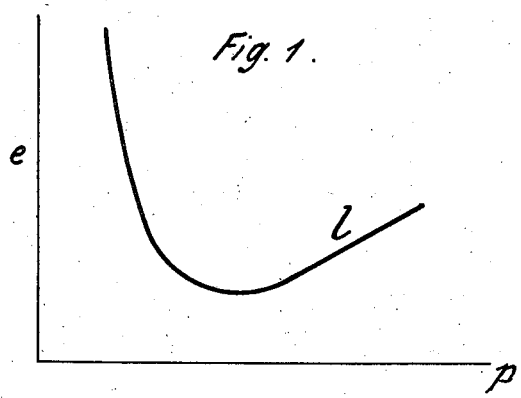
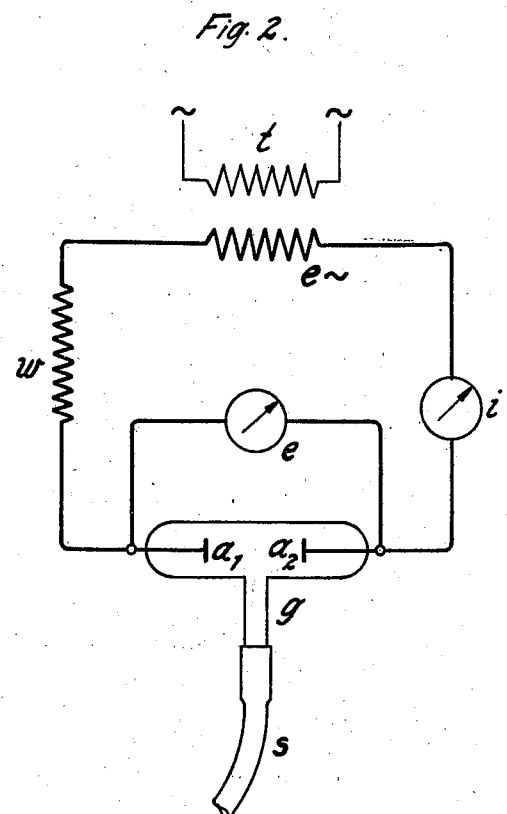

UNITED STATES PATENT OFFICE.

BÉLA BENÖ SCHÄFER, OF BADEN, SWITZERLAND, ASSIGNOR TO GLEICHRICHTER-AKTIENGESELLSCHAFT, OF GLARUS, SWITZERLAND.

APPARATUS FOR MEASURING THE VACUUM IN LARGE RECTIFIERS.

1,377,282.    Specification of Letters Patent.    Patented May 10, 1921.

Application filed July 14, 1920. Serial No. 396,300.

*To all whom it may concern:*

Be it known that I, BÉLA BENÖ SCHÄFER, a citizen of the German Realm, residing at No. 39 Schartenstrasse, Baden, Switzerland, have invented certain new and useful Improvements in Apparatus for Measuring the Vacuum in Large Rectifiers, of which the following is a specification.

The present invention has for its object the provision of a simple and efficient means of measuring the degree of vacuum in a closed chamber, by taking advantage of the fact that in a closed chamber containing two electrodes insulated from the chamber walls and from each other and with a gap between them, the voltage necessary to bridge the gap depends upon the degree of rarefaction of the gas within the chamber.

Figure 1 shows graphically an example of the law which exists between the bridging voltage and the degree of rarefaction of the gas, while Fig. 2 is an example of an arrangement of connections according to the invention.

In Fig. 1:—$l$ is a curve representing this dependency or relation of the electrode voltage $e$ upon or to the pressure $p$. For example, at a given pressure of about 0.2 mm. of mercury in a space that is free from foreign gases and is filled only with rarefied air, a voltage of 300 volts is sufficient to cause a glow discharge (silent discharge).

At a higher or lower pressure the requisite voltage increases, especially in the area of the higher degrees of rarefaction. This phenomenon may be utilized with advantage for the purpose of ascertaining the degree of vacuum existing in a large rectifier.

For this purpose the arrangement of connections shown in Fig. 2 may be employed, where $g$ is a discharging vessel which contains electrodes $a_1$ and $a_2$ and is connected, for instance by means of a flexible pipe $s$, to the rectifier container that is to be tested. The source of current $t$ consists of a transformer having its secondary $e$ connected through a resistance $w$ and amperemeter $i$ to the terminals of the discharging vessel $g$. The degree of the vacuum or rarefaction of the air can be ascertained without further trouble directly from the visible manifestations of light as well as from the indications of the amperemeter $i$.

Likewise a criterion for the air pressure that is to be ascertained is also furnished by the voltmeter $e$ which is connected in parallel to the electrodes $a_1$ and $a_2$ (Fig. 1).

What I claim is:—

1. The method of measuring vacuum, which consists in testing the electrical conductivity of the vacuum to be measured by passing an electric current therethrough and producing an observable light phenomena indicative of the degree of rarefaction and measuring the voltage of the current by means of an electrical measuring instrument.

2. An apparatus for measuring vacuum including an observable transparent chamber, means for connecting said chamber to a vessel whose degree of vacuum is to be measured, spaced electrodes in said chamber, an electric circuit including said electrodes connected with a source of alternating current, and a voltmeter connected across said electrodes.

3. An apparatus for measuring vacuum including an observable transparent chamber, means for connecting said chamber to a vessel whose degree of vacuum is to be measured, spaced electrodes in said chamber, an electric circuit including said electrodes connected with a source of alternating current, a voltmeter connected across said electrodes, and an amperemeter introduced in said circuit.

In testimony whereof I have signed my name to this specification.

BÉLA BENÖ SCHÄFER.